(12) United States Patent
Wilkins et al.

(10) Patent No.: US 6,532,656 B1
(45) Date of Patent: Mar. 18, 2003

(54) GAS TURBINE ENGINE COMPRESSOR BLADE RESTORATION METHOD

(75) Inventors: Melvin H. Wilkins, Loveland, OH (US); Sean J. Corrigan, Fairfield, OH (US); William T. Dingwell, West Chester, OH (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 09/974,313

(22) Filed: Oct. 10, 2001

(51) Int. Cl.[7] ............................................. B23P 15/00
(52) U.S. Cl. ................ 29/889.1; 29/402.13; 29/889.72
(58) Field of Search .................... 29/889.1, 889.72, 29/889.7, 557, 558, 402.08, 402.13, 402.11, 402.16; 228/119

(56) References Cited

U.S. PATENT DOCUMENTS

| | | | |
|---|---|---|---|
| 4,141,127 A | | 2/1979 | Cretella et al. |
| 4,309,848 A | | 1/1982 | Arrigoni |
| 4,611,744 A | * | 9/1986 | Fraser et al. ................. 228/119 |
| 4,743,733 A | | 5/1988 | Mehta et al. |
| 4,822,248 A | * | 4/1989 | Wertz et al. .............. 29/402.07 |
| 4,903,888 A | * | 2/1990 | Clark et al. ............ 219/121.45 |
| 4,958,431 A | * | 9/1990 | Clark et al. .............. 29/402.09 |
| 4,998,005 A | | 3/1991 | Rathi et al. |
| 5,048,183 A | | 9/1991 | Cang et al. |
| 5,071,054 A | * | 12/1991 | Dzugan et al. ............. 228/119 |
| 5,092,942 A | * | 3/1992 | Fraser et al. ................. 148/529 |
| 5,183,390 A | * | 2/1993 | Amos ....................... 228/114.5 |
| 5,197,191 A | * | 3/1993 | Dunkman et al. ....... 29/402.19 |
| 5,216,808 A | * | 6/1993 | Martus et al. .............. 29/889.1 |
| 5,281,062 A | | 1/1994 | Dunkman et al. |
| 5,395,584 A | | 3/1995 | Berger et al. |
| 5,448,828 A | * | 9/1995 | Willems et al. ............ 29/889.1 |
| 5,525,429 A | | 6/1996 | Mannava et al. |
| 5,655,701 A | * | 8/1997 | Quattrocchi et al. ........ 228/119 |
| 5,675,892 A | | 10/1997 | Mannava et al. |
| 5,697,151 A | * | 12/1997 | Werner et al. ........... 29/402.18 |
| 5,735,044 A | | 4/1998 | Ferrigno et al. |
| 5,794,338 A | | 8/1998 | Bowden, Jr. et al. |
| 5,822,852 A | * | 10/1998 | Bewlay et al. ................. 164/98 |
| 5,846,057 A | | 12/1998 | Ferrigno et al. |
| 5,898,994 A | * | 5/1999 | Miller et al. .................... 134/2 |
| 5,913,555 A | | 6/1999 | Richter et al. |
| 5,956,845 A | | 9/1999 | Arnold |
| 5,972,424 A | | 10/1999 | Draghi et al. |
| 6,049,978 A | | 4/2000 | Arnold |
| 6,172,327 B1 | | 1/2001 | Aleshin et al. |
| 6,200,689 B1 | | 3/2001 | Ferrigno et al. |
| 6,238,187 B1 | | 5/2001 | Dulancy et al. |
| 6,269,540 B1 | | 8/2001 | Islam et al. |
| 6,339,878 B1 | * | 1/2002 | Owen et al. ................ 29/889.1 |
| 6,347,446 B1 | * | 2/2002 | Luthra et al. ............ 29/402.18 |

* cited by examiner

Primary Examiner—I. Cuda-Rosenbaum
(74) Attorney, Agent, or Firm—Steven J. Rosen; David L. Narciso

(57) ABSTRACT

A method of repairing a gas turbine engine compressor blade airfoils includes machining away airfoil material along leading and trailing edges and a radially outer tip of the airfoil to form leading edge, trailing edge, and tip cut-backs. Then beads of welding material are welded onto the leading edge, trailing edge, and tip cut-backs. Then some of the weld material is machined away from the weld bead to obtain desired finished dimensions of the leading and trailing edges and radially outer tip. Blade material along only radially outermost portions of the leading and trailing edges extending from the tip towards a base of the airfoil is machined away. A rounded corner is formed between the leading edge and trailing edge cut-backs and unmachined portions of the airfoil between the outermost portions of the leading and trailing edges and the base of the airfoil.

21 Claims, 4 Drawing Sheets

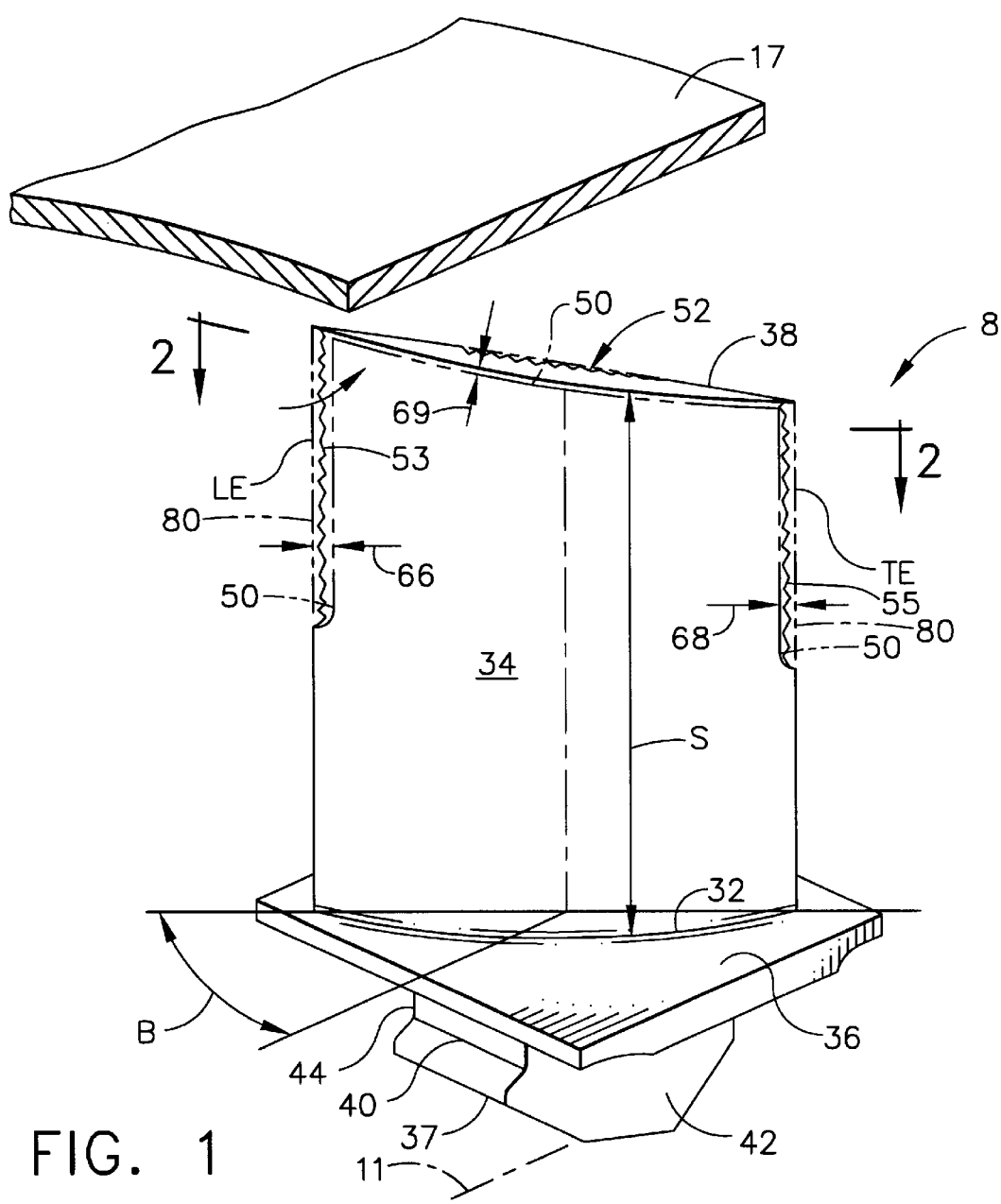
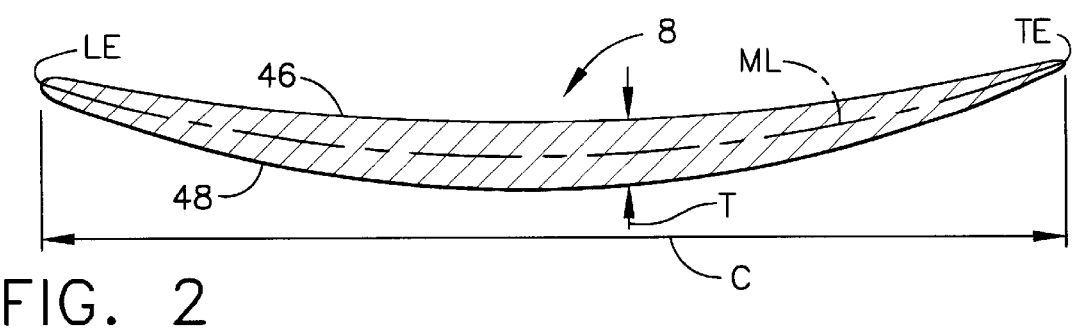
FIG. 1
FIG. 2

GAS TURBINE ENGINE COMPRESSOR BLADE RESTORATION METHOD

BACKGROUND OF THE INVENTION

Field of the Invention

This invention relates to gas turbine engine compressor blade dimensional restoration and, in particular, cutting out damaged area and welding in material to build up airfoil edges and tips.

A gas turbine engine includes a compressor section, a combustion section and a turbine section. Disposed within the turbine section are alternating annular stages of circumferentially disposed moving blades and stationary vanes. The rows or stages of vanes and blades are concentrically located about a centerline axis of the gas turbine engine. The blades are typically mounted on a disk which rotates about its central axis though integrally formed disks and blades referred to as BLISKS in the industry may also be used. Compressor blades are typically forged from superalloys such as a nickel-base alloy. In addition, the casting of turbine vanes and blades is frequently performed so as to produce a directionally solidified part, with grains aligned parallel to the axis of the blade or a single crystal part, with no grain boundaries.

In service, damage and deterioration of leading and trailing edges and tip of the compressor blade occurs due to oxidation, thermal fatigue cracking and metal erosion caused by abrasives and corrosives in the flowing gas stream. During periodic engine overhauls, the blades are inspected for physical damage and measurements are made to determine the degree of deterioration and damage. If the blades have lost substantial material they are replaced.

Several methods exist for repairing the worn or damaged turbine blades and vanes. Repair methods include, for example, conventional fusion welding, plasma spray as described in U.S. Pat. No. 4,878,953, and the use of a tape or slurry material containing a mixture of a binder and a metal alloy powder which is compatible with the substrate alloy. U.S. Pat. No. 4,878,953 provides an excellent source of background information related to methods for refurbishing cast gas turbine engine components and particularly for components made with nickel-base and cobalt-base superalloys for use in the hot sections of gas turbine engines and, more particularly, for components exposed to high temperature operating conditions. U.S. Pat. No. 4,726,104, entitled "Methods for Weld Repairing Hollow, Air Cooled Turbine Blades and Vanes" discloses prior art methods for weld repairs of air cooled turbine blade tips including squealer tips.

Some gas turbine engine compressor blades are designed so that during engine operation, the tip portion of the rotating blades rubs a stationary seal or casing, and limits the leakage of working medium gases in the axial flow direction. While the seals are usually more abradable than are the blade tips (so that during such rub interactions, a groove is cut into the seal), the blade tips do wear, and the blades become shorter. As the blades accumulate service time, the total tip wear increases to the point that eventually, the efficiency of the blade and seal system is reduced and cracks may appear in the blades especially at the blade tips such that the blades need to be repaired or replaced. Repairing is much cheaper and more desirable.

The tips of worn blades can be repaired, and the length of the blade increased, by mechanically removing, such as by grinding down, the worn and/or damaged tip area and then adding weld filler metal to the tip to build up the tip to a desired dimension using any of several well known welding techniques (typically arc welding techniques) known to those skilled in the art. When an engine is overhauled, compressor blades are either replaced by new parts, which is very expensive, or repaired, which is clearly more desirable if a cost savings may be achieved. Several methods have been devised in which a metal overlay is deposited by spraying or welding metal metallic filler onto a substrate to form or dimensionally restore gas turbine engine compressor blade airfoils and more particularly the blade tip.

Damage and/or wear of the leading and trailing edges and tip of compressor blades typically requires replacement of the blade and, therefore, a comprehensive repair process that can repair and dimensionally restore the edges and tip is highly desirable. The present invention is directed at a method for repairing a worn or damaged compressor blade having leading and trailing edge and blade tip wear and/or damage.

BRIEF DESCRIPTION OF THE INVENTION

The present invention is a repair process for gas turbine engine compressor blade airfoils with worn and/or damaged leading and trailing edges and tip. The method includes machining away airfoil material along leading and trailing edges and a radially outer tip of the airfoil to form leading edge, trailing edge, and tip cut-backs having cut-back depths of the leading and trailing edges and radially outer tip. Then beads of welding material are welded onto the leading edge, trailing edge, and tip cut-backs. Then some of weld material of weld bead is machined away to obtain desired finished dimensions of the leading and trailing edges and radially outer tip.

In the exemplary embodiment of the present invention, blade material along only radially outermost portions of the leading and trailing edges extending from the tip towards a base of the airfoil is machined away. A rounded corner is formed between the leading edge and trailing edge cut-backs and unmachined portions of the leading and trailing edges between the outermost portions of the leading and trailing edges and the base of the airfoil. In a more particular embodiment, the rounded corner is a semi-circular corner having an arc and radius of curvature. In another more particular embodiment, the outermost portion of the leading and trailing edges has a length of about half a span of the airfoil between the tip towards the base of the airfoil. In the exemplary embodiment, weld bead material is machined away to obtain the desired finished dimensions of the leading and trailing edges and radially outer tip by rough and then final blending of the weld beads. Desired finished dimensions of the leading edge is obtained by contouring of the leading edge. In another more particular embodiment, the leading and trailing edges are cut-back by about 0.08 to 0.12 inches from new part dimensions of the leading and trailing edges. Welding parameters and cut-back depths are controlled to prevent airfoil deformation that would require further cold processing to qualify the airfoil. The weld bead is manufactured with an automated plasma-arc weld process along the cut-back leading and trailing edges and radially outer tip.

Damage and/or wear of the leading and trailing edges and tip of compressor blades may be repaired with the present invention instead of more expensive replacement of the blades. The present invention provides a comprehensive repair process that can economically repair and dimensionally restore the edges and tips.

BRIEF DESCRIPTION OF THE DRAWINGS

The foregoing aspects and other features of the invention are explained in the following description, taken in connection with the accompanying drawings where:

FIG. 1 is a perspective view illustration of an exemplary aircraft gas turbine engine compressor blade illustrating wear and/or damage along leading and trailing edges and tip of the blade and dimensional restoration and repair parameters used in an exemplary embodiment of the present invention.

FIG. 2 is a cross-sectional view illustration of the blade through 2—2 in FIG. 1.

DETAILED DESCRIPTION OF THE INVENTION

Figure 3:
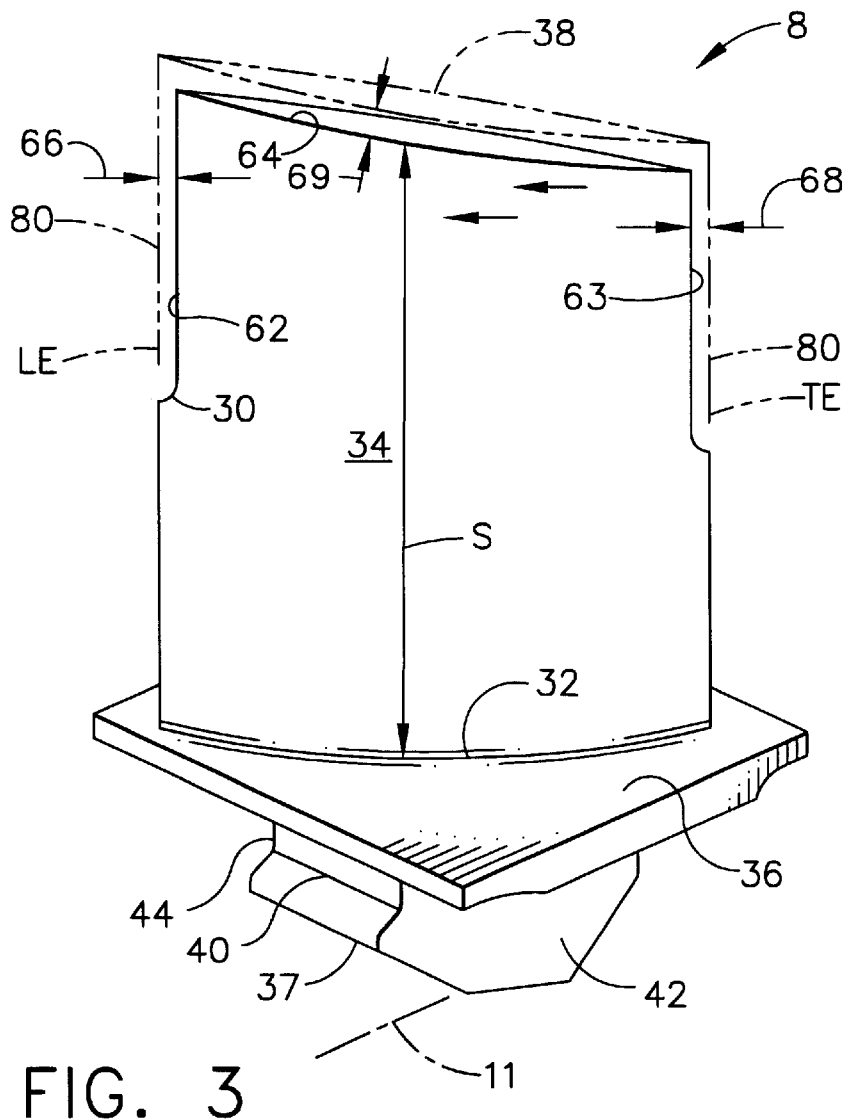
FIG. 3 is a side view illustration of the blade in FIG. 1 after cut-backs have been machined.

Illustrated in FIGS. 1 and 2 is a compressor blade 8 circumscribed by a compressor casing 17 (or seal) against which the blades seal. The compressor blade 8 includes an airfoil 34 extending radially outward from an airfoil base 32 located at a blade platform 36 to a blade or airfoil tip 38. The compressor blade 8 includes a root section 40 extending radially inward from the platform 36 to a radially inward end 37 of the root section 40. A blade root or dovetail 42 is connected by a blade shank 44 to the platform 36 at the radially inward end 37 of the root section 40. Referring to FIG. 2, a chord C of the airfoil 34 is the line between the leading edge LE and trailing edge TE at each cross section of the blade. The airfoil 34 extends in the chordwise direction between a leading edge LE and a trailing edge TE of the airfoil. A pressure side 46 of the airfoil 34 faces in the general direction of rotation as indicated by the arrow and a suction side 48 is on the other side of the airfoil and a mean-line ML is generally disposed midway between the two faces in the chordwise direction. Often the airfoil 34 also has a twist whereby a chord angle B varies from the platform 36 to the tip 38. The chord angle B is defined as the angle of the chord C with respect to the engine centerline 11. Occasionally, but repeatably, the compressor blade 8 rubs on the compressor casing 17 respectively and shroud 19 causing tip damage 52, including burrs, nicks, and tears, on a blade tip 38. Wear and FOD damage also result in leading and trailing edge damage 53 and 55 on the leading and trailing edges LE and TE, respectively, and also include burrs, nicks, and tears.

The present invention is a repair method or process for gas turbine engine compressor blade airfoils 34 with worn and/or damaged leading and trailing edges and tip. The repair method is a comprehensive process for restoring the leading and trailing edges and tip of the blade. The process is typically preceded by an inspection of the airfoil 34 to determine repairability. Referring to FIG. 2, typical repairability limits include a minimum blade thickness T and a maximum chord reduction which is for the exemplary embodiment is about 5 percent of the chord C. After the blade 8 is found to have met repairability requirements the blade is cleaned and prepped for repair.

Figure 5:
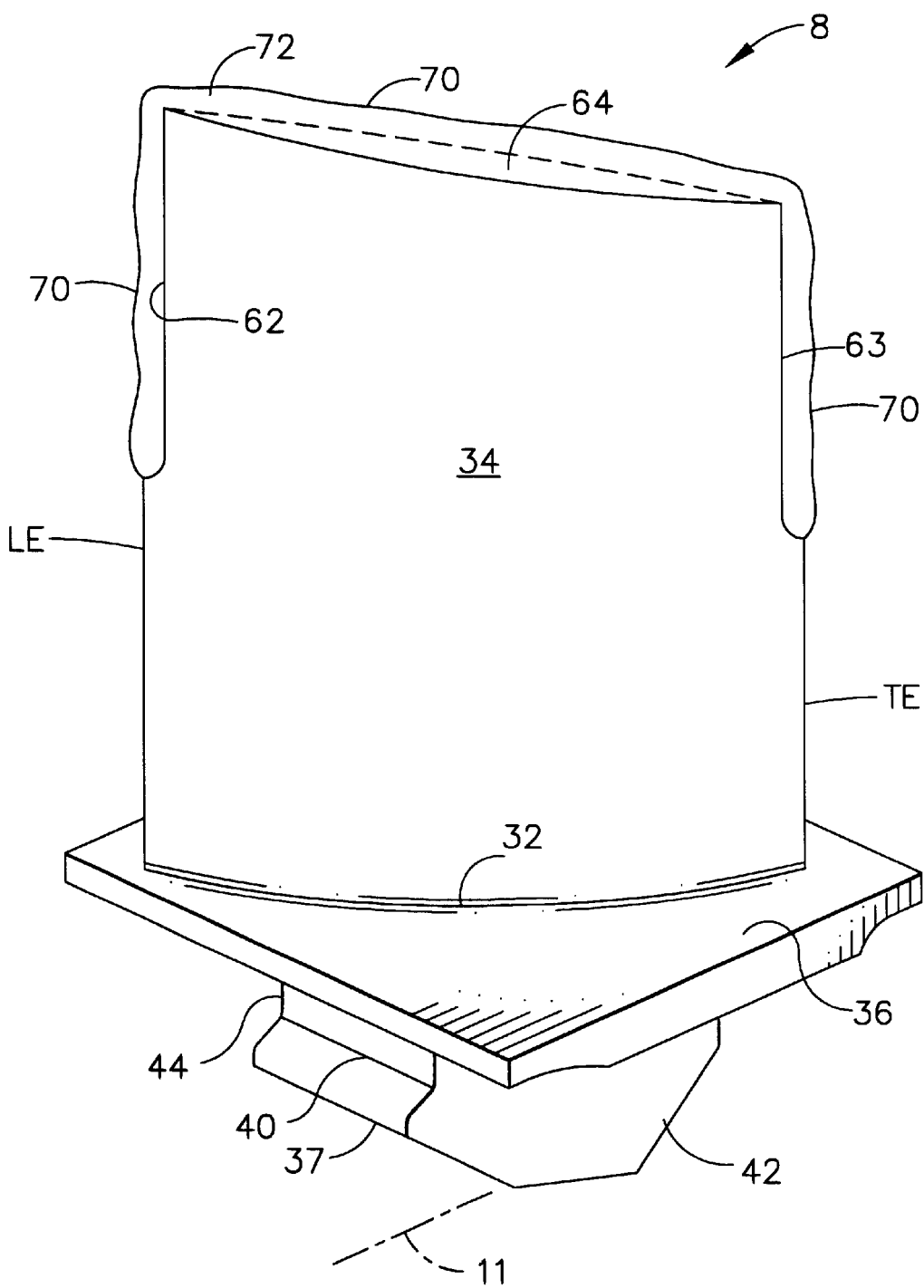
FIG. 5 is a side view illustration of the blade in FIG. 3 after welding of material to form build up over the cut-backs.
Figure 6:
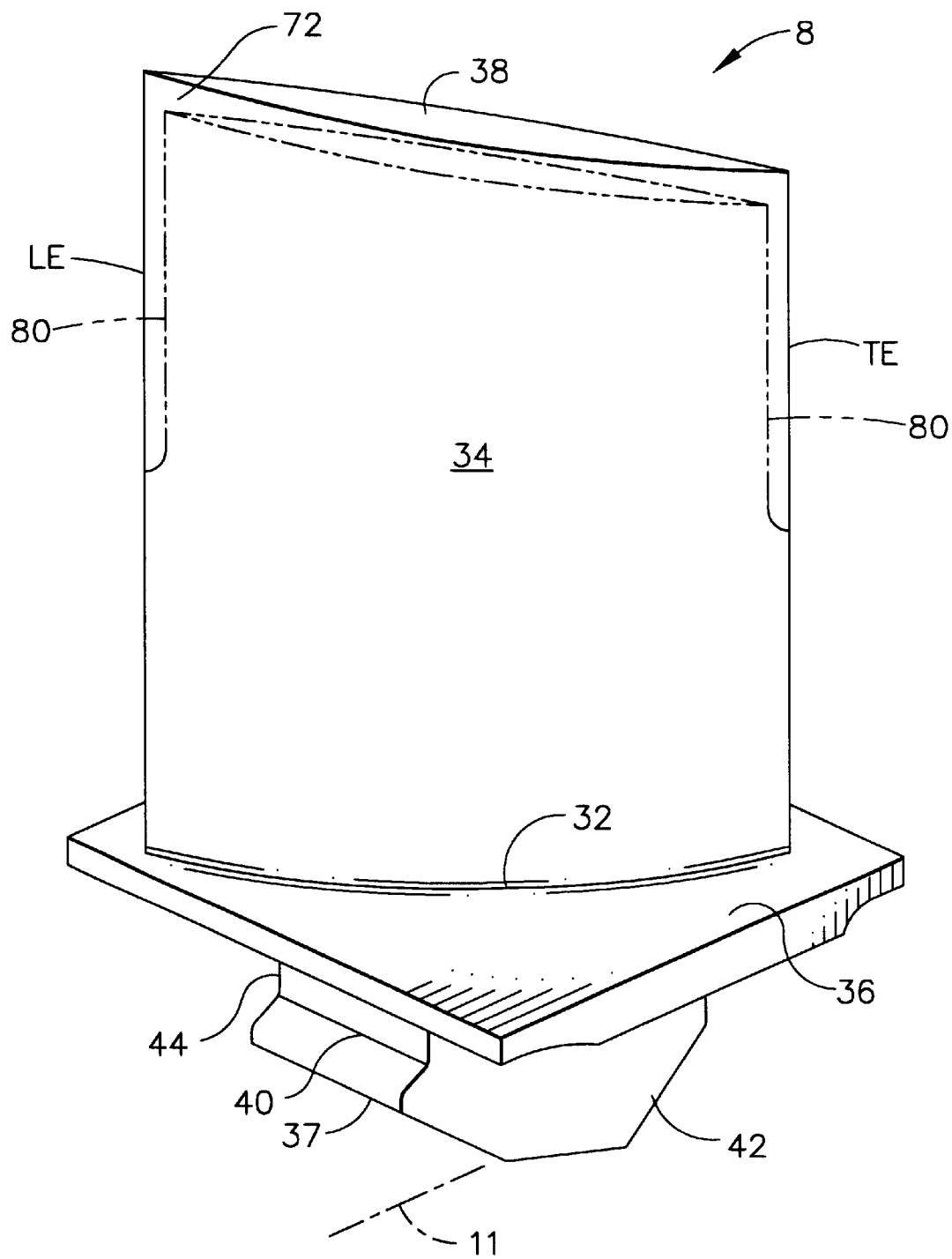
FIG. 6 is a perspective view illustration of the repaired and dimensionally restored blade in FIG. 1.

Referring to FIG. 1, the repair method includes machining away airfoil material 50 along leading and trailing edges LE and TE and a radially outer tip 38 of the airfoil 34 to form leading edge, trailing edge, and tip cut-backs 62, 63, 64 having leading edge, trailing edge, and tip cut-back depths 66, 68, 69, respectively, of the leading and trailing edges and radially outer tip as illustrated in FIG. 3. The leading edge, trailing edge, and tip cut-back depths 66, 68, 69 are measured from the original unworn and undamaged leading and trailing edges LE and TE and radially outer tip 38 as illustrated in FIGS. 1 and 3. The machined away airfoil material 50 incudes the portions of the airfoil 34 containing the tip damage 52, and the leading and trailing edge damage 53 and 55. Referring to FIG. 5, after the airfoil material 50 has been machined away, beads 70 of welding material 72 are welded onto the leading edge, trailing edge, and tip cutbacks 62, 63, 64. Then some of the weld material 72 is machined away to obtain desired finished or restored dimensions of the leading and trailing edges and radially outer tip 38 as illustrated in FIG. 6. Exemplary airfoil materials 50 are A-286 and Inconel 718. AMS 5832 or Inconel 718 weld wire is an exemplary weld material 72 which can be used with both of these airfoil materials.

Figure 4:
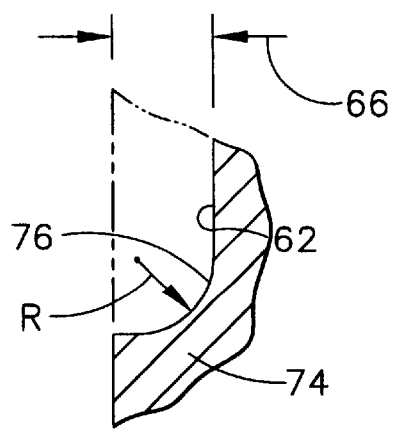
FIG. 4 is a side view illustration of rounded corners of leading edge cut-back in FIG. 3.

In the exemplary embodiment of the present invention, blade material along only radially outermost portions 80 of the leading and trailing edges LE and TE extending from the tip 38 towards the base of the airfoil is machined away. Typically, blade material along only a radially outer half 28 of the airfoil 34 is machined away. As further illustrated in FIG. 4, a fillet or rounded corner 30 is formed between the leading edge and trailing edge cut-backs 62 and 63 and unmachined portions 74 of airfoil 34 between the outermost portions 80 of the leading and trailing edges LE and TE and the base 32 of the airfoil 34. In the exemplary embodiment, the rounded corner is a semi-circular corner having an arc 76 and radius of curvature R. The outermost portions 80 of the leading and trailing edges are about half a span S of the airfoil 34 between the tip 38 towards the base 32 of the airfoil.

In the exemplary embodiment, weld bead material is machined away to obtain the desired finished dimensions of the leading and trailing edges and radially outer tip by rough and then final blending of the weld beads. Desired finished dimensions of the leading edge is obtained by contouring of the leading edge. Welding parameters and cut-back depths are controlled to prevent airfoil deformation that would require further cold processing to qualify the airfoil for use. The weld bead is manufactured with an automated plasma-arc weld process along the cut-back leading and trailing edges and radially outer tip. A Liburdi Laws 500 welding center is one suitable apparatus for the process.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A method of repairing a gas turbine engine compressor blade airfoil, said method comprising the steps of:

machining away airfoil material along leading and trailing edges and a radially outer tip of the airfoil to form leading edge, trailing edge, and tip cut-backs having cut-back depths of the leading and trailing edges and radially outer tip, welding a bead of welding material onto the leading edge, trailing edge, and tip cut-backs, and machining away some of the weld bead material to obtain desired finished dimensions of the leading and trailing edges and radially outer tip.

2. A method as claimed in claim 1, wherein the machining away airfoil material along the leading and trailing edges includes machining away blade material along only radially outermost portions of the leading and trailing edges extending from the tip towards a base of the airfoil.

3. A method as claimed in claim 2, wherein the machining away blade material along the leading and trailing edges includes forming a rounded corner between the leading edge and trailing edge cut-backs and unmachined portions of the airfoil between the outermost portions of the leading and trailing edges and the base of the airfoil.

4. A method as claimed in claim 2, wherein the outermost portion of the leading and trailing edges has a length of about half a span of the airfoil between the tip towards and the base of the airfoil.

5. A method as claimed in claim 3, wherein the outermost portion of the leading and trailing edges has a length of about half a span of the airfoil between the tip towards and the base of the airfoil.

6. A method as claimed in claim 4, wherein the machining away weld bead material to obtain desired finished dimensions of the leading and trailing edges and radially outer tip includes rough and then final blending of the weld bead.

7. A method as claimed in claim 6, wherein the machining away weld bead material to obtain desired finished dimensions of the leading edge further includes contouring of the leading edge.

8. A method as claimed in claim 6, wherein the leading and trailing edges are cut-back by about 0.08 to 0.12 inches from new part dimensions of the leading and trailing edges.

9. A method as claimed in claim 6, wherein welding parameters and cut-back depths are controlled to prevent airfoil deformation that would require further cold processing to qualify the airfoil.

10. A method as claimed in claim 6, wherein the weld bead is manufactured with an automated plasma-arc weld process along the cut-back leading and trailing edges and radially outer tip.

11. A method as claimed in claim 10, wherein the machining away weld bead material to obtain desired finished dimensions of the leading edge further includes contouring of the leading edge.

12. A method as claimed in claim 11, wherein the leading and trailing edges are cut-back by about 0.08 to 0.12 inches from new part dimensions of the leading and trailing edges.

13. A method as claimed in claim 11, wherein welding parameters and cut-back depths are controlled to prevent airfoil deformation that would require further cold processing to qualify the airfoil.

14. A method as claimed in claim 3, wherein the rounded corner is a semi-circular corner having an arc and radius of curvature.

15. A method as claimed in claim 14, wherein the outermost portion of the leading and trailing edges has a length of about half a span of the airfoil between the tip towards and the base of the airfoil.

16. A method as claimed in claim 15, wherein the machining away weld bead material to obtain desired finished dimensions of the leading and trailing edges and radially outer tip includes rough and then final blending of the weld bead.

17. A method as claimed in claim 16, wherein the machining away weld bead material to obtain desired finished dimensions of the leading edge further includes contouring of the leading edge.

18. A method as claimed in claim 17, wherein the leading and trailing edges are cut-back by about 0.08 to 0.12 inches from new part dimensions of the leading and trailing edges.

19. A method as claimed in claim 16, wherein the weld bead is manufactured with an automated plasma-arc weld process along the cut-back leading and trailing edges and radially outer tip.

20. A method as claimed in claim 19, wherein the machining away weld bead material to obtain desired finished dimensions of the leading edge further includes contouring of the leading edge.

21. A method as claimed in claim 20, wherein the leading and trailing edges are cut-back by about 0.08 to 0.12 inches from new part dimensions of the leading and trailing edges.

* * * * *